United States Patent [19]

Anderson et al.

[11] Patent Number: 5,706,442

[45] Date of Patent: Jan. 6, 1998

[54] SYSTEM FOR ON-LINE FINANCIAL SERVICES USING DISTRIBUTED OBJECTS

[75] Inventors: William P. Anderson, Kansas City, Mo.; Jacob B. Geller, Montclair, N.J.

[73] Assignee: Block Financial Corporation, Kansas City, Mo.

[21] Appl. No.: 580,074

[22] Filed: Dec. 20, 1995

[51] Int. Cl.[6] .................................. G06F 157/800
[52] U.S. Cl. ........................................... 395/227
[58] Field of Search .......................... 395/226, 227, 395/234, 239, 240, 242, 243, 244; 380/24, 30

[56] References Cited

U.S. PATENT DOCUMENTS

| | | | |
|---|---|---|---|
| 5,283,829 | 2/1994 | Anderson | 380/24 |
| 5,383,113 | 1/1995 | Kight et al. | 395/240 |
| 5,570,465 | 10/1996 | Tsakanikas | 395/114 |
| 5,590,197 | 12/1996 | Chen et al. | 380/24 |

OTHER PUBLICATIONS

Sirbu et al., "NetBill: An Internet Commerce System Optimized for Network-Delivered Services", IEEE Personal Communications, vol. 2, Issue 4, Aug. 1995, pp. 34-39.

*Primary Examiner*—Donald E. McElheny, Jr.
*Attorney, Agent, or Firm*—Standley & Gilcrest

[57] ABSTRACT

A system is disclosed for accessing recent financial information from various financial services providers. The system is based on a client/server architecture so that services are accessible from a variety of presentation tools. Communications between clients and servers are accomplished using "interfaces" that group operations and attributes for various services. The system uses the TCP/IP protocol suite so financial services are available at any time and from any location.

11 Claims, 3 Drawing Sheets

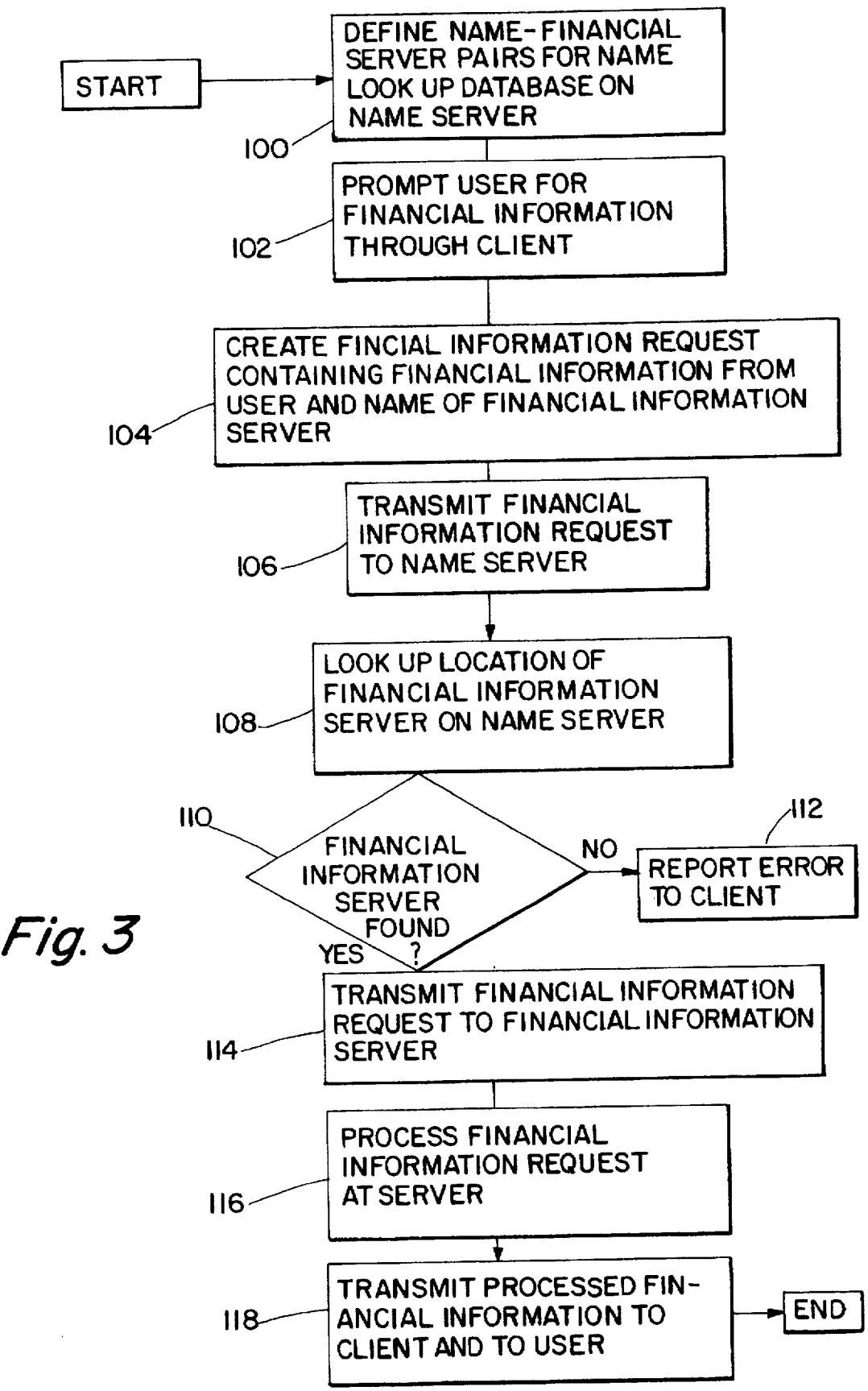

SYSTEM FOR ON-LINE FINANCIAL SERVICES USING DISTRIBUTED OBJECTS

BACKGROUND AND SUMMARY OF THE INVENTION

The present invention relates generally to client/server computer systems. Particularly, the present invention relates to a client/server architecture for delivering financial services to customers of various financial institutions.

Customers of various types of financial institutions such as banks, stock brokerages, credit card companies, and insurance companies often have a need to access information regarding recent account activity or their account balances. Typically, financial information is reported to customers in the form of monthly statements that list the account's activity and balance for the previous month. By the time these statements are processed and sent, they no longer reflect the current state of the account. Account balances may change on a daily basis for a variety of reasons including the addition of interest earned or the processing of a new transaction.

Customers in need of more timely information regarding their accounts usually have the option of calling a customer service representative of the financial institution to request a balance or activity report. Although the information is timely, it may be difficult or inconvenient to obtain. First, customers must call each institution from which they would like to obtain current information. When calling, they may need to wait for someone who can help. At other times, they may be required to traverse many levels of an automated attendant before reaching an option that will allow them to accomplish a specific task such as obtaining a current account balance. In either case, the information is presented verbally rather than in a written form that more closely resembles a statement. Finally, whether the information is communicated verbally or through a written statement, customers who wish to use the information in a computer program must enter it manually. In addition to the inconvenience, the process of manually entering the data is also error prone.

Customers of various financial institutions therefore, have a need to access recent financial information at their own convenience—preferably, from anywhere and at any time. Furthermore, customers have a need to see the financial data presented in an organized and understandable format similar to the monthly statement format with which customers are familiar. The present invention—Conductor$^{SM}$ System Architecture (Conductor)—supports a suite of on-line financial services from various financial services providers. Supported services include credit card account lookup and reporting, and checking and bill paying. In addition, customers and financial services providers may communicate with each other. Finally, the financial information obtained electronically may be downloaded directly to customers' personal computers for further processing. The need for manual data entry is eliminated.

The present invention is a sophisticated computer software system based on distributed system technology. Within the system, use of the TCP/IP protocol suite for communications with major components of the system allows the financial services to be accessed through the Internet. The same services may also be accessed directly through an on-line information service such as CompuServe®. Conductor supports a distributed "information cluster" located on the global Internet so it may be accessed at any time from around the world using any one of a number of presentation tools. A variety of financial services from a number of independent financial services providers are supported by the system so that users may review activity and balances relating to different types of accounts. The ability to use a variety of presentation tools to access a suite of financial services supported by a variety of financial services providers is unique to the present invention. The advantages of the present invention and others are explained farther by the accompanying drawings and detailed description.

BRIEF DESCRIPTION OF THE DRAWINGS

FIG. 3 is a flowchart of the primary steps of the present invention.

DETAIL DESCRIPTION OF PREFERRED EMBODIMENT(S)

The Conductor System Architecture (Conductor) and its related protocols provide a robust suite of on-line Interfaces for use by applications, financial service providers, Web (hyper-text transfer protocol—HTTP) servers, and other clients to obtain and manipulate financial information for users of the system. Applying principles of modularity and abstraction, distributed systems technologies are used to define the major components of Conductor and their interrelationships to allow delivery of diverse types of financial services over a wide area network. Sources of data may be as varied as the Interfaces to it. Financial information systems using the approach of Conductor are easily extensible because Conductor is based on a platform-portable, language-independent distributed object framework. Client components and server components work in concert to provide timely financial information to users of an on-line financial information system built using Conductor. Use of the distributed approach of a client/server model permits the easy integration of new services and providers for the system. For example, server components of Conductor may easily serve as back-end resources for existing on-line service providers. The distributed approach also allows applications running in the system to be accessible through a number of presentation tools or users interfaces (collectively, clients): for example, native Microsoft® Windows® applications, Web (hyper-text mark-up language—HTML) browsers, text-terminals, X.25 transactions, even voice telephony.

Figure 1:
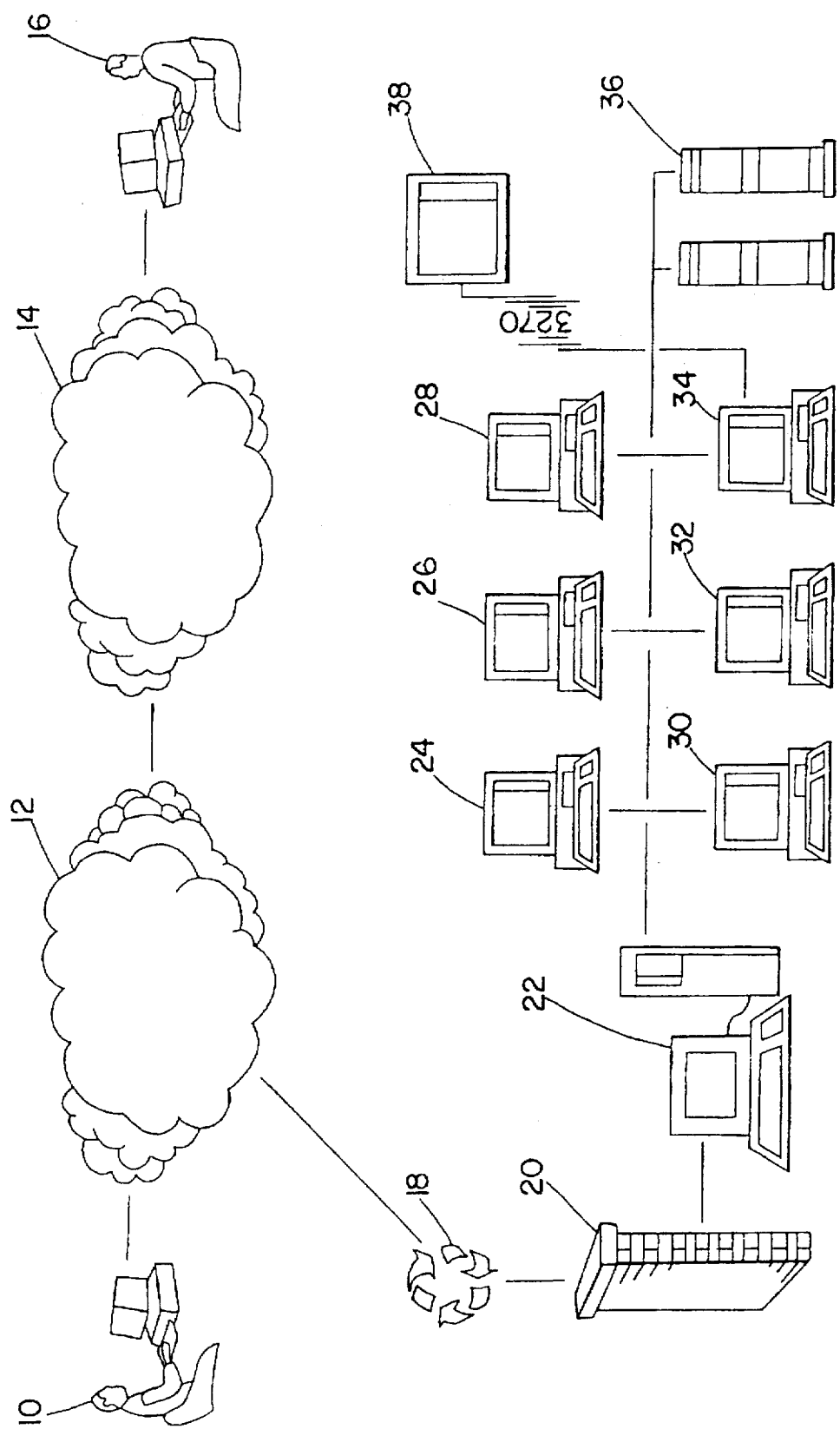
FIG. 1 is a diagram of the Conductor Network illustrating the components of a financial information service system based on the Conductor System Architecture.

Referring to FIG. 1, a diagrammatic representation of the Conductor Network is shown. The Conductor Network illustrates use of the Conductor System Architecture to provide a suite of financial services accessible through different user interfaces. Preferably, users connect to the suite of on-line financial services in the Conductor Network via the Internet 12. Methods for providing services via the Internet are well-known in the art and are not explained here. Host computers in the network are accessible world-wide from any site with TCP/IP name resolution and packet routing to the conductor.com domain. Preferably, host computers running the Windows NT™ Operating System and the UNIX® Operating System are used in the distributed environment. Clients and servers may rim on any of twenty operating system. Multiple user interfaces to applications that are part of the Conductor Network are implemented as different types of clients. As shown in FIG. 1, a user may communicate with a financial application via a Web (hyper-text markup language—HTML) browser 10 or via the CompuServe Information Service 14 using the CompuServe Information Manager for Windows® (WinCIM®) 16. Other methods of access may be used as well—for example, a native Microsoft® Windows® application. In addition, Conductor components may include financial services that are part of an on-line information service so that they are available only to subscribers of the on-line information service.

As shown in FIG. 1, packets destined for the Conductor Network are routed 18 to a Web Server 22 for processing. Because security is a significant issue for on-line financial information system, a Firewall 20 is established between the Router 18 and the Web Server 22. User verification and data access may then occur in a secure environment. Separate user connect/data access protocols isolate internal/external networks. An indirect method of user identification is used to secure account numbers and sensitive data are passed via two-key encryption. Token passing is used for connected host identification.

The Conductor System Architecture is itself built on a Common Object Request Broker Architecture (CORBA)-compliant Distributed Object Computing Platform. This development platform is well-known in the art and is not explained here. Primary system components include Financial Object Servers, Distributed Name (or Name Lookup) Servers, and Database Servers. Other components include Communication, Security, and Logging servers. As shown in FIG. 1, a number of Distributed Name (or Name Look-up) Servers 24, 26, 28 and Financial Object Servers 30, 32, 34 may be in operation at one time. When running, these servers may communicate with a Legacy System 38 or other Database Servers 36 in order to respond to specific requests for information. Data requests may be serviced in any one of a number of ways. For example, data may be accessed using a Microsoft® SQL Server running on Windows NT™.

Clients and servers in a Conductor based system communicate according to an application-level protocol. The application-level protocol specifies how a client interprets data sent to it by a server. Differences in the implementation of various services are hidden behind this consistent API. Within applications, the protocol for communication between various components is a call-level API. When one part of the application needs something, it calls a procedural interface in another part. Such calls do not return until the procedure has executed so the flow of control is simple and direct. Extending these synchronous procedure calls across the network interface has the advantage of simplifying the access to distributed resources by elevating it to the level of standard procedural mechanisms familiar to a majority of developers.

Clients in a Conductor system have an object-oriented Application Programming Interface (API) to the distributed resources or services using a class-like construct called an "Interface" which groups operations and attributes. Interfaces are used by applications, financial service providers, Web (hyper-text transfer protocol-HTTP) servers, and clients to obtain and manipulate financial information for users of the system. Because clients know only the nature of the Interface, it may be implemented in any manner. For example, Interfaces may be implemented in one language and clients in another. The implementation of an Interface may then be altered at will without affecting any clients. As long as the protocol to the Interface is stable, the client implementation is stable.

Clients located anywhere on the global Internet ask for and bind to services by name. Clients locate Interfaces by naming a server which implements one, and they may do so from any site with a TCP connection to the Conductor domain (conductor.com). The names of servers are provided by a name lookup Interface which rims on the only host whose name clients need to know. Following name lookup, a client begins communication with a server capable of servicing the client's specific request. The access is synchronous and call-level using either C++, Smalltalk, or C. In other words, clients access services by making standard synchronous procedure calls. Client load is automatically apportioned among all ready object servers at lookup time.

There are several benefits to using name lookup to connect clients and servers. A name lookup layer isolates clients from the location or readiness of any individual server. Although the financial information system is based on the Internet Protocol (IP), clients are completely isolated from back-end data sourcing concerns and do not need to know the IP addresses of servers. Using this approach, servers may be added simply by connecting to the network, installing system and server software, and adding the machine name to the lookup database. Consequently, clients are not affected by database, network, operating system, hardware platform, or server architectural changes. For example, native 32-bit Windows® applications may use client-side abstraction libraries that hide details of binding to and executing calls on remote servers. Servers may be implemented on cheap, fast Intel-based Windows NT™ network servers and new servers may be added to the system by copying files over and adding the host name to a single locator file. The distributed nature of the system means that it is composed of relatively simple applications that implement a single Interface or a small group of interfaces through which clients and servers communicate.

Another benefit of using name lookup to connect clients and servers is that servers may have geographical independence. Site independence for servers means that different servers may be developed and maintained by different financial services providers. User access mechanism provided by clients remain the same so users may access new financial services using familiar methods.

The interface between clients and servers is binary. For various reasons, a binary interface to information and services is preferable to a textual one. Such an interface is more efficient and the data may be useful in more varied applications. Binary data may be converted to text for viewing by humans, sent in binary form to other providers, or retrieved in binary form and processed by a consumer application. Binary objects may be dragged off of a window and dropped into a finance application or they may be used to generate reports.

Figure 2:
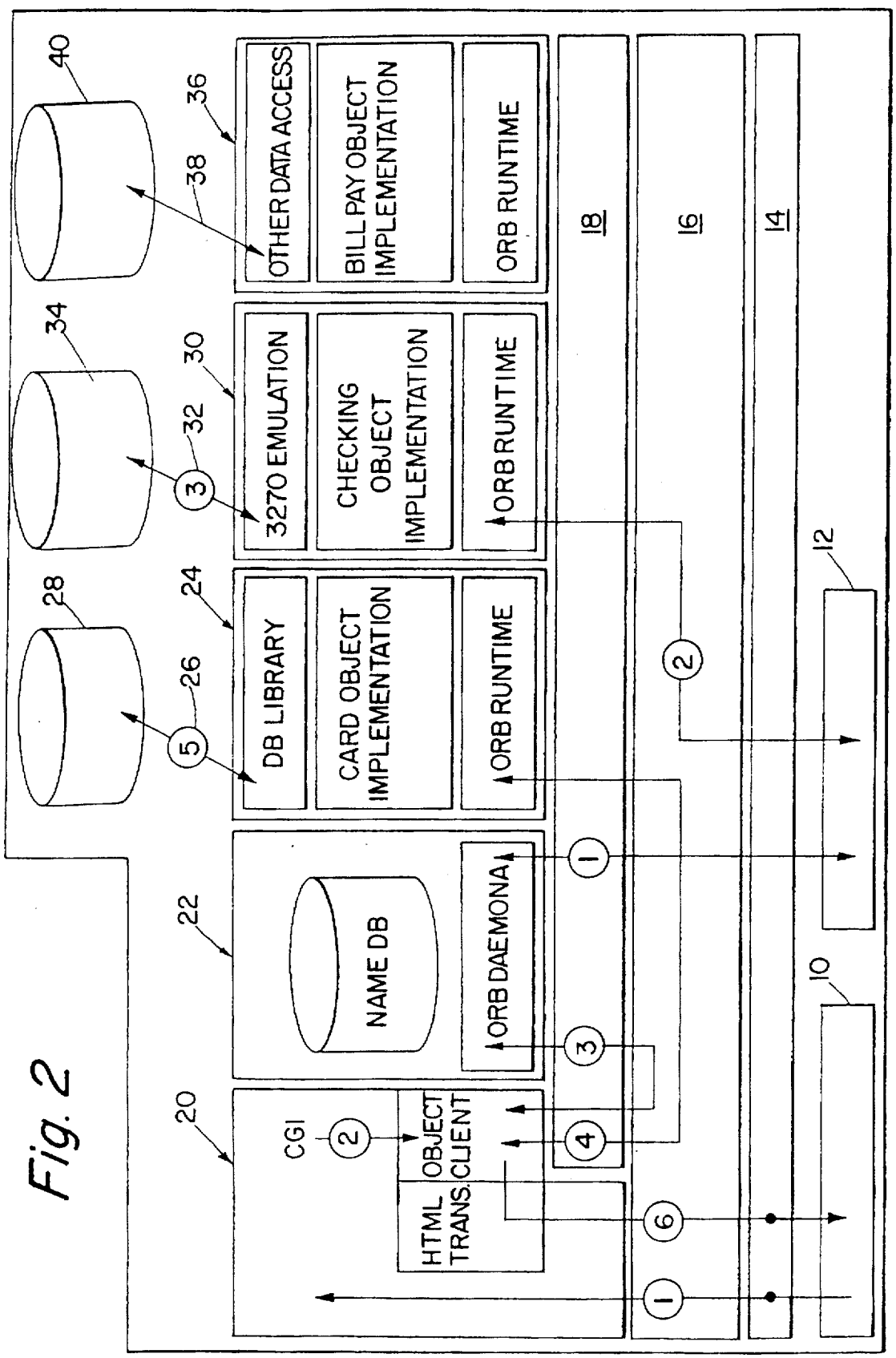
FIG. 2 is a block diagram of the Conductor System Architecture.

Referring to FIG. 2, a diagram of the client and server components of a financial information system based on the Conductor System Architecture is shown. Among the server components supported by Conductor are databases. For example, financial information of interest to users of the system is contained in different databases 28, 34, 40 within the distributed environment. Each database has its own access mechanism 26, 32, 38. As explained earlier, among the methods for accessing a system based on the architecture are a Web (hyper-text markup language-HTML) browser 10 that communicates through a Web Server 20 or a native Windows® application 12. Regardless of the user interface or client in operation (e.g., Web browser 10 or Windows application 12), a financial information request that includes the name of a financial information service 42, 44 may be transmitted from the client 10, 12 to be processed by the name server 22. In the case of the Windows application 12, the financial information request 42 may be transmitted directly to the name server 22. In the case of the Web browser 10, the financial information request may be processed through a Web server 20 that communicates with the name server 22 to determine the location of the financial server to process the request. This approach therefore allows financial services to be implemented as objects and distributed throughout a wide area network such that they may be found through the name server 22.

The Firewall 14 increases system security of applications running in the Conductor environment. The TCP/IP protocol stack 16 is the Internet communication vehicle. Another Conductor component—the Object Request Broker (ORB)—is an "information bus" that connects clients to the servers or objects they need in a heterogeneous environment. By definition, an ORB is platform independent, language neutral, and may run in many networked environments. In other words, ORBs provide interoperability between applications on different machines in a heterogeneous environment. ORBs implemented in one language may communicate with those implemented in another, on a completely different hardware platform. The same is true for the object implementations to which the ORB provides access. Three example objects are shown in FIG. 2—a card object 24, a checking object 30, and a bill pay object 36. The objects serve as links between clients 10, 12 and data contained in the databases 28, 34, 40. The name server 22 performs the name lookup function for clients so they may establish communication with the financial object that performs the needed services.

Referring now to FIG. 3, there is shown a flowchart of the primary steps of the present invention. Initially, name-financial server pairs are defined and loaded into a name lookup database on the name server 100. Name-server pairs may be added and/or modified as needed. Next, a user may be prompted for financial information such as the user's primary bank, account numbers, type of information desired (e.g., recent debit card transactions), etc. 102. The client with which the user is interacting (e.g., Web browser) may then create an electronic financial information request comprising the financial information provided by the user and the name of a financial information server that can provide the requested information 104. The electronic financial information request is then transmitted from the client to the name server 106. A database look-up is performed in accordance with the name contained in the financial information request 108. If the name of the financial information server is not found in the database 110, an error is reported to the client 112. If the name of the financial information server is found in the database 110, the financial information request is transmitted to the financial information server located during the database look-up 114. The financial information server then processes the financial information request 116 and the processed information is transmitted back to the client and ultimately, the user 118.

The distributed nature of the Conductor System Architecture means that a financial services system may be composed of relatively simple financial services applications accessible from one of several interfaces. The result of this is that each financial service application is easier to develop and maintain, and the Conductor-based financial services system at large is more flexible and robust. The present invention has been described in the form of preferred embodiments. However, several modifications and variations may be made to the invention and fall within the scope of the claims.

What is claimed is:

1. An on-line financial information service system based on a distributed system architecture, comprising:

at least one financial information server for processing financial information requests;

a name for said financial information server;

at least one data server for processing requests for data from said financial information server;

an electronic financial information request from a client, said request including said financial information server name;

at least one name server for processing said electronic financial information request from said client by locating said financial information server, said location determined by said financial information server name; and a communication link between said client and said financial information server at said location.

2. The system of claim 1, wherein said client is a hyper-text markup language browser.

3. The system of claim 1, wherein said client is a presentation tool for an online information service.

4. The system of claim 1, wherein said communication link between said client and said financial information server is through an object-oriented application programming interface.

5. A method for providing financial information through a distributed system, comprising the steps of:

providing a plurality of financial information servers capable of servicing electronic financial information requests;

providing a name server for determining locations of said financial information servers;

providing a client capable of transmitting electronic financial information requests to said plurality of financial information servers;

specifying by name a financial information server capable of servicing an electronic financial information request, said name specified by said client;

determining within said plurality of financial information servers a location for said financial information server with said name, said location determined by said name server; and binding said client to said financial information server at said location.

6. The method of claim 5, wherein said binding consists of a synchronous procedure call by said client to said financial information server.

7. The method of claim 5, wherein said locations for said financial information servers are based on Internet Protocol addresses.

8. The method of claim 5, wherein said financial information servers are developed and maintained by a plurality of financial service providers.

9. The method of claim 5, wherein said client is a hyper-text markup language browser.

10. The method of claim 5, wherein said client is a presentation tool for an online information service.

11. An on-line financial information service system, comprising:

a plurality of financial information servers capable of servicing electronic financial information requests;

a name for each of said plurality of financial information servers;

a client capable of transmitting an electronic financial information request, said request including a name of one of said financial information servers;

an interface for linking said client to one of said financial information servers; and a name server for processing said electronic client financial information request by locating said interface, said location associated with said financial information server name.

* * * * *

UNITED STATES PATENT AND TRADEMARK OFFICE
CERTIFICATE OF CORRECTION

PATENT NO. : 5,706,442
DATED : January 6, 1998
INVENTOR(S) : William P. Anderson and Jacob B. Geller It is certified that error appears in the above-identified patent and that said Letters Patent is hereby corrected as shown below:

In column 2, line 60, please delete the word "rim" and replace it with -- run --.

In column 3, line 66, please delete the word "rims" and replace it with -- runs --.

In column 4, line 49, please delete "28" and replace it with -- 52 -- and delete "34" and replace it with -- 58 --.

In column 4, line 52, please delete "26" and replace it with -- 50 -- and delete "32" and replace it with -- 56 -- and delete "38" and replace it with -- 62 --.

In column 4, line 54, please delete "20" and replace it with -- 22 --.

In column 4, line 55, please delete "12" and replace it with -- 14 --.

In column 4, line 57, please delete "12" and replace it with -- 14 --.

In column 4, line 59, please delete "12" and replace it with -- 14 --.

In column 4, line 60, please delete "22" and replace it with -- 24 -- and delete "12" and replace it with -- 14 --.

UNITED STATES PATENT AND TRADEMARK OFFICE
CERTIFICATE OF CORRECTION

PATENT NO. : 5,706,442
DATED : January 6, 1998
INVENTOR(S) : William P. Anderson and Jacob B. Geller It is certified that error appears in the above-identified patent and that said Letters Patent is hereby corrected as shown below:

In column 4, line 64, please delete "20" and replace it with -- 22 --.

In column 4, line 65, please delete "22" and replace it with -- 24 --.

In column 5, line 2, please delete "22" and replace it with -- 24 --.

In column 5, line 3, please delete "14" and replace it with -- 20 --.

In column 5, line 17, please delete "24" and replace it with -- 48--.

In column 5, line 18, please delete "30" and replace it with -- 54 -- and delete "36" and replace it with -- 60 --.

In column 5, line 19, please delete "12" and replace it with -- 14--.

In column 5, line 20, please delete "28" and replace it with -- 52-- and delete "34" and replace it with -- 58 -- and delete "22" and replace it with -- 24 --.

In Figure 2, please delete lead line "12" and replace it with -- 14 --.

In Figure 2, please delete lead line "14" and replace it with -- 20 --.

In Figure 2, please delete lead line "16" and replace it with -- 46 --.

In Figure 2, please delete lead line "20" and replace it with -- 22 --.

UNITED STATES PATENT AND TRADEMARK OFFICE
CERTIFICATE OF CORRECTION

PATENT NO. : 5,706,442
DATED : January 6, 1998
INVENTOR(S) : William P. Anderson and Jacob B. Geller It is certified that error appears in the above-identified patent and that said Letters Patent is hereby corrected as shown below:

In Figure 2, please delete lead line "22" and replace it with -- 24 --.

In Figure 2, please delete lead line "24" and replace it with -- 48 --.

In Figure 2, please delete lead line "26" and replace it with -- 50 --.

In Figure 2, please delete lead line "28" and replace it with -- 52 --.

In Figure 2, please delete lead line "30" and replace it with -- 54 --.

In Figure 2, please delete lead line "32" and replace it with -- 56 --.

In Figure 2, please delete lead line "34" and replace it with -- 58 --.

In Figure 2, please delete lead line "36" and replace it with -- 60 --.

In Figure 2, please delete lead line "38" and replace it with -- 62 --.

Signed and Sealed this

Twenty-sixth Day of May, 1998

Attest:

BRUCE LEHMAN

Attesting Officer

Commissioner of Patents and Trademarks